US012783693B1

(12) United States Patent
Sengupta et al.

(10) Patent No.: US 12,783,693 B1
(45) Date of Patent: Nov. 3, 2026

(54) SYSTEMS AND METHODS FOR DATA LINEAGE AUTHENTICATION

(71) Applicant: Wells Fargo Bank, N.A., San Francisco, CA (US)

(72) Inventors: Shuvam Sengupta, Kolkata (IN); Himanshu Baral, Fremont, CA (US); Rameshchandra Bhaskar Ketharaju, Hyderabad (IN); Manpreet Singh, Telangana (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 226 days.

(21) Appl. No.: 18/058,371

(22) Filed: Nov. 23, 2022

(51) Int. Cl.
*G06F 21/60* (2013.01)

(52) U.S. Cl.
CPC .... *G06F 21/602* (2013.01); *G06F 2221/2101* (2013.01)

(58) Field of Classification Search
CPC ................................ G06F 21/602; H04L 9/50
See application file for complete search history.

(56) References Cited

U.S. PATENT DOCUMENTS 10,176,308 B2 1/2019 Mintz
10,481,961 B1 * 11/2019 Chapin .................... G06F 9/54
10,503,905 B1 * 12/2019 Misra ...................... G06F 21/64
10,503,923 B1 * 12/2019 Gupta ................. G06F 21/6218
10,602,202 B1 * 3/2020 Taylor .................... G06F 16/48
10,951,420 B2 3/2021 Borne-Pons et al.
11,075,757 B2 7/2021 Schiatti et al.
11,301,460 B2 4/2022 Rich et al.
11,539,507 B1 * 12/2022 Vijayvergia .......... H04L 9/0637
12,254,000 B2 * 3/2025 Bhattacharya ...... G06F 11/1458
2018/0025435 A1 1/2018 Karame
2018/0288022 A1 10/2018 Madisetti et al.
2019/0109707 A1 4/2019 Ajoy
2019/0207750 A1 * 7/2019 Harvey ................. H04L 9/0643
2019/0236598 A1 8/2019 Padmanabhan
2019/0238316 A1 8/2019 Padmanabhan
2020/0007513 A1 1/2020 Gleichauf
2020/0019545 A1 1/2020 Ye
2020/0026785 A1 * 1/2020 Patangia ............... H04L 9/0643
2020/0104523 A1 * 4/2020 Theimer ............... G06F 16/172
2020/0134066 A1 4/2020 Yegorin
(Continued)

OTHER PUBLICATIONS

Ghosh, Bishakh Chandra, et al., "Leveraging Public-Private Blockchain Interoperability for Closed Consortium Interfacing." IEEE Infocom 2021—IEEE Conference on Computer Communications. IEEE, 2021. (10 pages).

*Primary Examiner* — Hee Soo Kim
(74) *Attorney, Agent, or Firm* — K&L Gates LLP

(57) ABSTRACT

Systems, apparatuses, methods, and computer program products are disclosed for documenting, storing, and authenticating data lineage of a piece of data. An example method for documenting, storing, and authenticating data lineage for the piece of data includes: obtaining information of a target, where the target is a piece of data and where the alteration information specifies that an action involving the target has been executed; generating a first data lineage NFT for the target, where the alteration information of the target is stored in the first data lineage NFT; and minting the first data lineage NFT onto a blockchain network.

20 Claims, 4 Drawing Sheets

(56) References Cited

U.S. PATENT DOCUMENTS

| | | | | |
|---|---|---|---|---|
| 2020/0410101 | A1* | 12/2020 | Misra | G06F 16/2358 |
| 2021/0182423 | A1 | 6/2021 | Padmanabhan | |
| 2021/0185091 | A1 | 6/2021 | Cage | |
| 2021/0250165 | A1* | 8/2021 | Crawford | H04L 9/0643 |
| 2021/0256070 | A1 | 8/2021 | Tran et al. | |
| 2021/0281410 | A1 | 9/2021 | Hain | |
| 2022/0076246 | A1 | 3/2022 | Griffin | |
| 2022/0270725 | A1 | 8/2022 | Derosa-Grund | |
| 2022/0303258 | A1 | 9/2022 | Mee | |
| 2022/0351306 | A1* | 11/2022 | Zemenchik | G06F 16/27 |
| 2022/0391895 | A1* | 12/2022 | Weber | G06Q 20/3823 |
| 2023/0034621 | A1* | 2/2023 | Pardo | H04L 9/3213 |
| 2023/0045080 | A1* | 2/2023 | Marks | H04L 9/50 |
| 2023/0162180 | A1* | 5/2023 | Deng | G06Q 20/381<br>705/64 |
| 2023/0222493 | A1* | 7/2023 | Jain | G06Q 10/40<br>705/69 |
| 2024/0070306 | A1* | 2/2024 | Jurat | G06F 21/6218 |
| 2024/0146552 | A1 | 5/2024 | Marsh | |
| 2024/0370861 | A1 | 11/2024 | Benvenuti | |

* cited by examiner

SYSTEMS AND METHODS FOR DATA LINEAGE AUTHENTICATION

BACKGROUND

Blockchain technology, the use of a distributed ledger that can process transactions across a network without a single point of failure, has grown rapidly in recent years in terms of popularity and technological advancement. Blockchain technology has also seen an explosion in popularity particularly in the form of cryptocurrencies and non-fungible token (NFT) exchanges (e.g., transactions).

BRIEF SUMMARY

Generally, in the technical fields of analytics and data management, having a clear and defined lineage (e.g., history) of an entire life cycle of a piece of data (e.g., a file, a folder, a time series, a data set, etc.) is ideal. In particular, reliability of modeling solutions (e.g., machine learning models, deep learning models, artificial intelligence (AI) models, expert systems, etc.) are all heavily impacted by the completeness and authenticity of such pieces of data. However, in reality, such data lineage is not well-documented, and the sources of records (e.g., records of the piece of data) are typically not documented electronically in a data repository (e.g., a data lake). Additionally, public sources (and even privately operated data sources) can be easily manipulated (e.g., tampered, altered, hacked, etc.) by bad actors, rendering these sources to be unsafe and unreliable. The inventors have realized these issues and have now proposed new methods for enhancing the documentation, storage, and authentication of data lineage for pieces of data.

In particular, systems, apparatuses, methods, and computer program products are disclosed herein for enabling data lineage documentation, storage, and authentication using blockchain tokens (namely, NFTs). More specifically, utilizing the immutability afforded by blockchain technology, embodiments herein enable enhanced documentation, storage, and authentication for data lineage for one or more pieces of data. In particular, embodiments herein tokenize the entire history (e.g., the data lineage) of a piece of data using NFTs to establish an unbroken chain whose provenance is immutable. Such tokenization of the data lineage of a piece of data using NFTs advantageously ensures that the data lineage is not only well-documented but also protected from manipulation by bad actors, which is a direct improvement over the above-discussed issues faced in the technical fields of analytics and data management.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
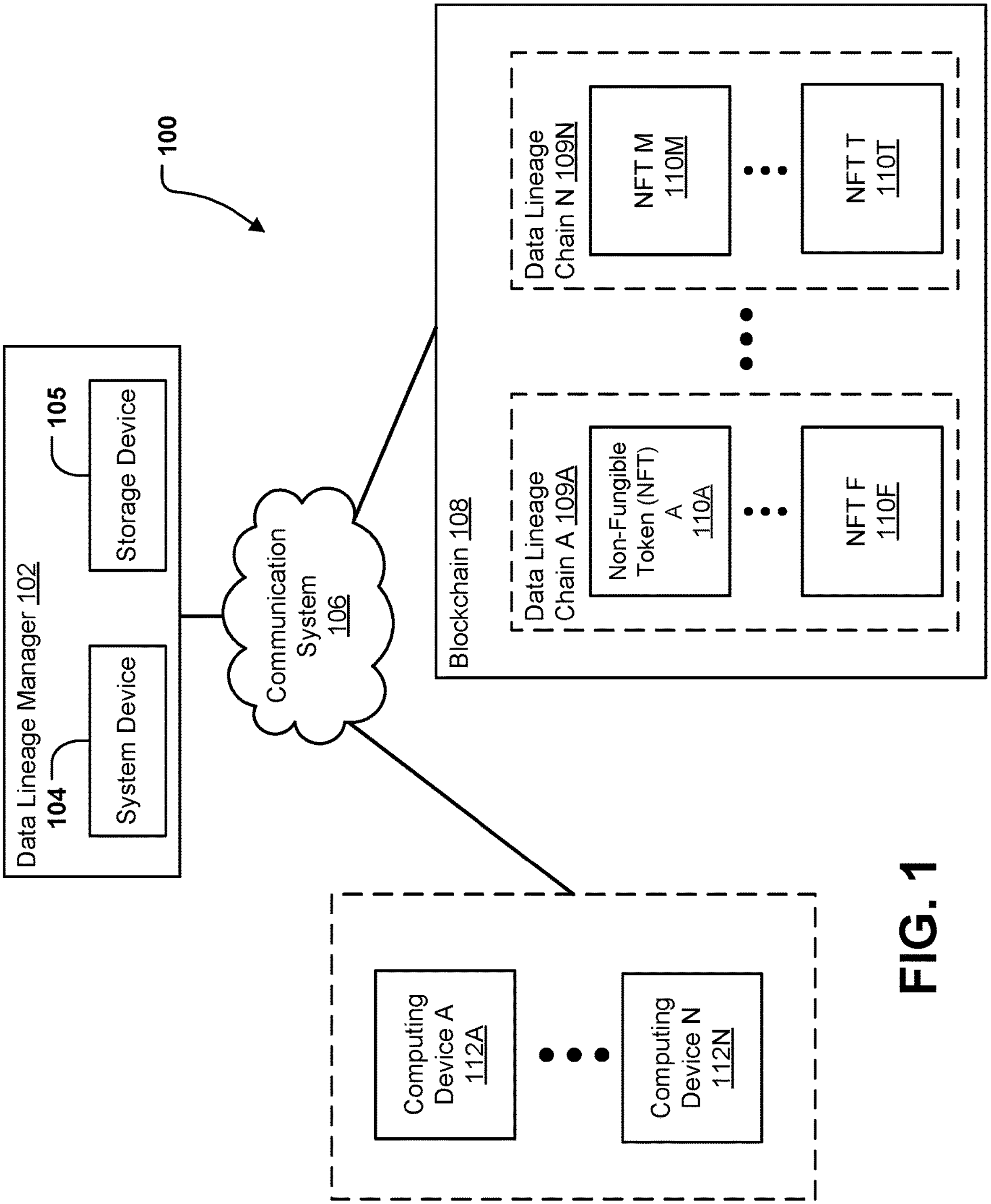
FIG. 1 illustrates a system in which some example embodiments may be used.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "block" refers to a data structure associated with a blockchain. For example, a block may comprise a model definition data structure, a block header data structure, a technical data structure, a business data structure, an operational data structure, a next block information data structure, any other suitable electronic information or data structure associated therewith (including, but not limited to, links or pointers), or any combination thereof. A block header data structure may comprise a current block hash value data structure, a previous block hash value data structure, a next block hash value data structure, a Merkle root hash value data structure, a nonce value data structure, any other suitable electronic information or data structure associated therewith (including, but not limited to, links or pointers), or any combination thereof.

The term "blockchain" refers to a digital ledger comprising a growing list of blocks. For example, a blockchain may comprise a plurality of blocks, any other suitable electronic information or data structure associated therewith (including, but not limited to, links or pointers), or any combination thereof.

The term "node device" or "node" refers to a computing device, such as a server device, client device, a database server device, a data storage device, or a blockchain data storage device that stores one or more portions of a blockchain. For example, a node device may comprise a server device, a client device, a database, a database server device, any other suitable device or data structure associated therewith (including, but not limited to, links or pointers), or any combination thereof.

The term "smart contract" refers to any code usable to perform changes in a blockchain or to carry some process in the blockchain. For example, a smart contract may comprise one or more blockchain-based data structures that digitally facilitate, verify, or enforce the negotiation or performance of a contract.

The term "blockchain token" refers to a record on a blockchain that may be transferred or traded, and typically comprises unique metadata. Blockchain tokens may be associated with a particular asset, either digital or physical. Blockchain tokens may be unique, and may include assets known as non-fungible tokens (NFT). A blockchain token may comprise a metadata structure, containing information such as the date and time of the token's creation, a name and description of the blockchain token, and links or other data relating the blockchain token to an asset. Possession of the blockchain token or NFT may confer ownership rights over the asset linked to the blockchain token.

The term "sidechain" refers to a secondary blockchain that operates in parallel to a primary blockchain. The sidechain may set different standards for consensus, record-keeping, or other properties of the sidechain that are distinct from those of the primary blockchain. For example, a sidechain may have a lower transaction cost and faster transaction times due to a less difficult consensus requirement, or faster block times, trading off faster transactions for reduced security. Sidechains may also be permissioned, allowing an entity or consortium to manage a sidechain while still maintaining a connection to the primary blockchain. Sidechains also permit assets on the sidechain to move to and from the main chain when needed, typically by means of a two-way bridge between the two blockchains, where predetermined rules for exchange between the two blockchains are established.

Overview

Methods, apparatuses, systems, and computer program products are described herein that provide for the documentation, storage, and authentication of data lineage using NFTs. Traditionally, it is difficult to document and authenticate changes made to a piece of data. Even if these changes (e.g., the data lineage of the piece of data) are well-documented, advancements in technology have enabled bad actors to easily gain access and manipulate (e.g., tamper, alter, hack, etc.) such stored data lineages.

In contrast to known conventional techniques in the fields of analytics and data management, example embodiments described herein tokenize the entire history (e.g., the data lineage) of a piece of data using NFTs to establish an unbroken chain whose provenance is immutable. More specifically, in some embodiments, an initial system of record (SOR) that comprises a source of a piece of data is known and tokenized as a genesis block in a data lineage chain created for that piece of data on a blockchain (also referred to herein as "blockchain environment"). Each time that piece of data is transformed (e.g., altered, manipulated, changed, transferred from one location to another, transferred from one owner to another, etc.), such transformations of the piece of data are recorded (e.g., through tokenization as a data lineage NFT) on the data lineage chain created for that piece of data. In some embodiments, information associated with these transformations to the piece of data may be recorded as metadata in a tokenized NFT (also referred to herein as "data lineage NFT"). Additionally, the data lineage NFT itself may store information such as: the source of the piece of data, an end location of the piece of data, and other similar properties and/or information associated with the piece of data.

In some embodiments, an original (unaltered) state of a piece of data may be stored as a genesis block on a data lineage chain created for that piece of data (i.e., the very first block that starts the data lineage chain for that piece of data). This genesis block may also be referred to herein as a genesis data lineage NFT. All subsequent transformations to the piece of data may be tokenized as one or more data lineage NFTs and stored as subsequent blocks (to the genesis block) on the data lineage chain created for that piece of data.

In some embodiments, a data lineage chain for a piece of data may be hosted (e.g., stored) on a globally available blockchain (e.g., a public blockchain such as Ethereum). Alternatively, the data lineage chain may be hosted on a private distributed ledger (e.g., a privately operated, permission-based blockchain).

In some embodiments, the transformation of the piece of data may include the execution of one or more actions involving the target (e.g., execution of actions on the target). The action(s) involving the target may include at least one of: transforming a content of the target, changing an ownership of the target, changing a property of the target, changing a storage location of the target, creating a copy of the target, transmitting the target or the copy of the target to a different location from a source of the target or the copy of the target, using the target, changing a retention policy of the target, changes (e.g., an expiration, extension, termination, etc.) in the retention policy, or the like. Such transformations of the piece of data may be expressed as alteration information of a piece of data. Details of the different location to which the piece of data or the copy of the piece of data is transmitted, details of the ownership of the piece of data, changes in the details of the ownership of the piece of data, details of the piece of data' retention policy, changes in the details of the retention policy, details with regard to one or more entities that used the data (e.g., name of the entities, time of use, number of uses, etc.), or the like, may also be included as part of the alteration information of the piece of data.

In some embodiments, one or more applications (e.g., smart contracts, application programming interfaces (APIs)) may be configured to monitor the piece of data and detect such transformations. When transformation of a piece of data is detected, the application(s) may be triggered to obtain the alteration information associated with the transformation. Alternatively, the alteration information may be manually reported by a user of a system (e.g., the owner of the piece of data, a third-party using the data for modeling solutions, etc.). The application(s) may be configured on a computing device hosting the piece of data and/or on a separate computing device that retrieved the piece of data from the computing device hosting the piece of data. More specifically, assume that a second computing device (e.g., operated by a third-party vendor, client, customer, etc.) retrieves the piece of data from a first computing device (e.g., operated by an owner of the piece of data) hosting the piece of data. The first computing device may generate another instance of the application(s) and transmit the newly generated instance of the application(s) to the second computing device such that transformations effected to the piece of data by/on the second computing device may also be recorded on an existing (or new, if one does not exist) data lineage chain of the piece of data. As a result, the second computing device may advantageously be enabled to continue building onto the data lineage chain of the piece of data in an uninterrupted manner. This is discussed in more detail below in reference to FIG. 4.

In some embodiments, in addition to transformations on the piece of data, information specifying data governance and/or a history of utilization of the piece of data may also be stored in a data lineage NFT on the data lineage chain created for the piece of data. Such storage of the data governance and/or the history of utilization advantageously ensures that the piece of data will more likely be able to withstand any regulatory or legal scrutiny.

Accordingly, the present disclosure sets forth systems, methods, and apparatuses that provide data lineage documentation, storage, and authentication using NFTs. There are many advantages of embodiments described herein. For instance, as a practical application of embodiments herein, providing enhanced documentation, storage, and authentication for pieces of data ensures the credibility and reliability of such pieces of data (e.g., when these pieces of data are used for modeling solutions involving machine learning models, deep learning models, artificial intelligence (AI) models, and/or expert systems. Such documentation, storage, and authentication of pieces of data may also allow owners of these pieces of data to better comply with said legal and regulatory requirements, and also allow owners to better track usages of the piece of data. For example, such tokenization of the data lineage of a piece of data using NFTs as discussed in one or more embodiments disclosed herein allows the owner of a piece of data (e.g., a piece of software) to keep track of a usage of the piece of data. Such tracking of the usage of the piece of data may advantageously allow the owner to more accurately and effectively enforce licenses established for the piece of data. More specifically, if each use of the piece of software is well documented on an immutable ledger available for public viewing, licenses on the piece of software can be more effectively enforced by reference to the number of uses recorded on the immutable ledger.

As a result, and as established above, such tokenization of the data lineage of a piece of data using NFTs as discussed in one or more embodiment disclosed herein advantageously ensures that the data lineage is not only well-documented but also protected from manipulation by bad actors, which is a direct improvement over the above-discussed issues faced in the technical fields of analytics and data management.

Although a high-level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment 100 within which various embodiments may operate. As illustrated, the environment 100 may include a data lineage manager 102 including a system device 104 and a storage device 105, a communications network 106 (e.g., the Internet), a blockchain 108 hosting data lineage chains 109A-109N, and computing devices 112A to 112N (or 112A-112N). Although system device 104, storage device 105, and blockchain are described in singular form, some embodiments may utilize more than of these components. Additionally, some embodiments of the data lineage manager 102 may not require a storage device 105 at all (e.g., the data lineage manager 102 may use an external storage device (not shown) connected on the communications network 106). Whatever the implementation, the data lineage manager 102, and its constituent system device(s) 104 and/or storage device(s) 105 may receive and/or transmit information via communications network 106 with any number of other devices, such as one or more other computing devices (not shown).

System device 104 may be implemented as one or more servers, which may or may not be physically proximate to other components of the environment 100. Furthermore, some components of system device 104 may be physically proximate to the other components of the data lineage manager 102 while other components are not. System device 104 may receive, process, generate, and transmit data, signals, and electronic information to facilitate the operations of the data lineage manager 102. Particular components of system device 104 are described in greater detail below with reference to apparatus 200 in connection with FIG. 2.

Storage device 105 may comprise a distinct component from system device 104, or may comprise an element of system device 104 (e.g., memory 204, as described below in connection with FIG. 2). Storage device 105 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 106). Storage device 105 may host the software executed to operate the data lineage manager 102. Storage device 105 may store information relied upon during operation of the data lineage manager 102, such as various payment card information (e.g., payment card identity, payment card data, etc.), feedback information (e.g., haptic patterns, audio patterns, visual effects and/or patterns, etc.), and/or other information that may be used by the data lineage manager 102, data and documents to be analyzed using the data lineage manager 102, or the like. In addition, storage device 105 may store control signals, device characteristics, and access credentials enabling interaction between the data lineage manager 102 and one or more of the blockchain 108 and the computing devices 112A-112N.

The data lineage manager 102 may be embodied by various computing devices known in the art, such as desktop or laptop computers, servers, server devices, or the like. For example, the data lineage manager 102 may be a server provisioned with software enabling the server to provide the methods of embodiments described herein for enabling documentation, storage, and authentication of data lineage using NFTs. Additional components of the data lineage manager 102 and their respective functions are described in more detail below with reference to apparatus 200 in connection with FIG. 2.

The blockchain 108 may include a collection of networked node devices, which may be permissionless (public), or permissioned (private). The blockchain 108 may use any distributed ledger or blockchain technology that is capable of creating and exchanging blockchain tokens (e.g., NFTs). In some embodiments, the blockchain 108 may allow for Turing-complete scripting of contracts, known also as smart contracts, to be executed on the blockchain. The blockchain 108 may be related to other blockchain networks not pictured here. For example, the blockchain 108 may be a sidechain of another blockchain network, or another network (not shown) may form a sidechain of the blockchain 108. The nodes may be embodied by specialized node devices, or may be embodied by any computing devices or server devices known in the art.

In embodiments disclosed herein, the blockchain 108 may be hosting (e.g., storing) one of more data lineage chains 109A-109N. Each of the data lineage chains 109A-109N may be made up of one or more NFTs 110A-110T. For example, as shown in FIG. 1, data lineage chain A 109A is made up of NFT A 110A through NFT F 110F, all of which are sequentially connected (in a chain-like fashion) to one another, while data lineage chain N 109N is made up of NFT M 110M through NFT T 110T, all of which are also sequentially connected (in a chain-like fashion) to one another. Each data lineage chain 109A-109N may be made up of any number of sequentially connected NFTs 110A-110T.

The computing devices 112A-112N may be embodied by various computing systems known in the art, such as desktop or laptop computers, servers, server devices, or the like. One or more of the computing devices 112A-112N may be operated by the same entity operating the data lineage manager 102 while other ones of the computing devices 112A-112N may be operated by entities (e.g., third-party entities including vendors, clients, customers, etc.) different from the entity operating the data lineage manager 102.

Figure 2:
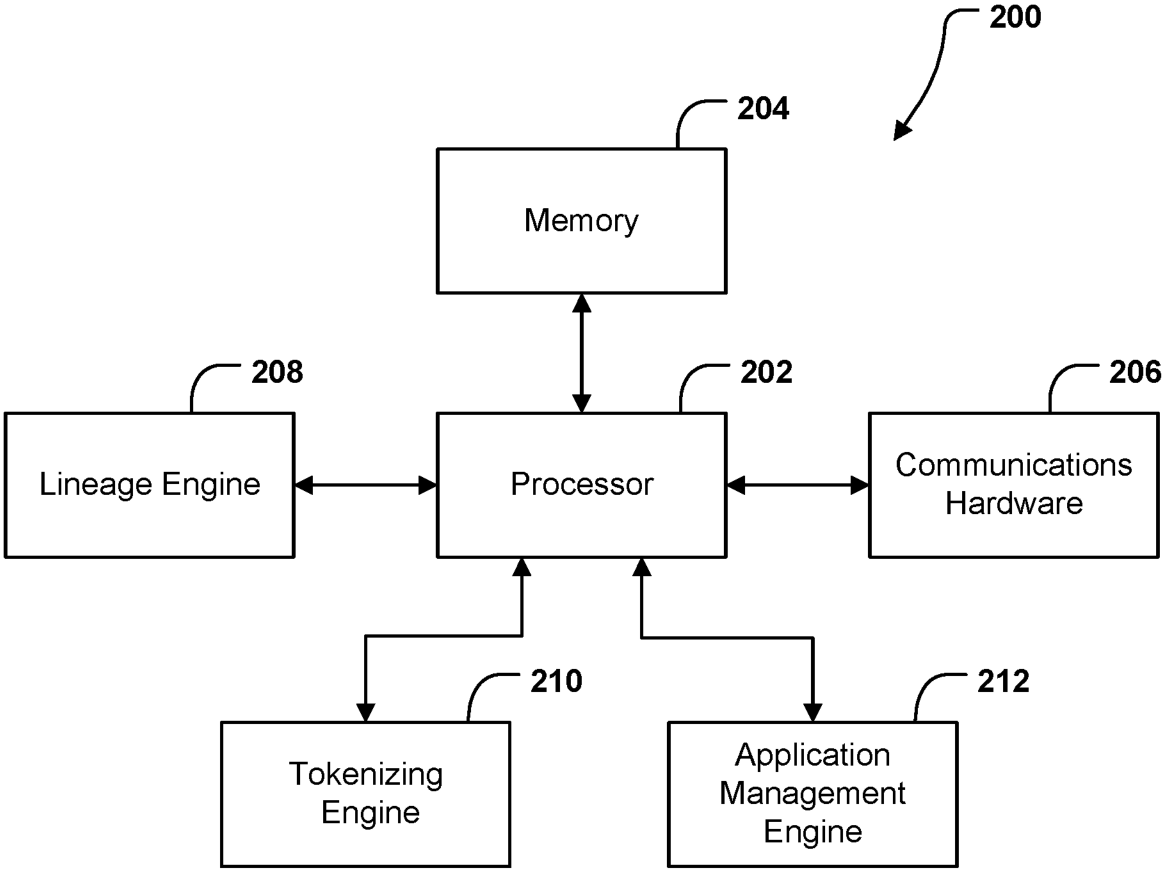
FIG. 2 illustrates a schematic block diagram of example circuitry embodying a device that may perform various operations in accordance with some example embodiments described herein.

Although FIG. 1 illustrates an environment 100 and implementation in which the data lineage manager 102 interacts with one or more of the blockchain 108, and/or the computing devices 112A-112N, in some embodiments users may directly interact (e.g., operate, control, modify, or otherwise interact to perform the various functions and achieve the various benefits described herein) with the data lineage manager 102 (e.g., via input/output circuitry of system device 104, which is discussed below in reference to FIG. 2).

Example Implementing Apparatuses

System device 104 of the data lineage manager 102 (described previously with reference to FIG. 1) may be embodied by one or more computing devices or servers, shown as apparatus 200 in FIG. 2. As illustrated in FIG. 2, the apparatus 200 may include processor 202, memory 204, communications hardware 206 including input-output circuitry (not shown), lineage engine 208, tokenizing engine 210, and application management engine 212, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIG. 3.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on storage device 105, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processor for causing transmission of such signals to a network or for handling receipt of signals received from a network. In some embodiments, the communications hardware 206 may include, for example, interfaces such as one or more ports (e.g., a laser port, a fiber-optic cable port, and/or the like) for enabling communications with other devices.

The communications hardware 206 may include input-output circuitry (not shown) configured to provide output to a user and, in some embodiments, to receive an indication of user input. It will be noted that some embodiments will not include input-output circuitry, in which case user input may be received via a separate device such as a separate client device or the like. The input-output circuitry of the communications hardware 206 may comprise a user interface, such as a display, and may further comprise the components that govern use of the user interface, such as a web browser, mobile application, dedicated client device, or the like. In some embodiments, the input-output circuitry may include a keyboard, a mouse, a touch screen, touch areas, soft keys, a microphone, a speaker, and/or other input/output mechanisms. The input-output circuitry may utilize the processor 202 to control one or more functions of one or more of these user interface elements through software instructions (e.g., application software and/or system software, such as firmware) stored on a memory (e.g., memory 204) accessible to the processor 202.

The apparatus 200 further comprises a lineage engine 208 that obtains alteration information of a target piece of data (also referred to herein simply as "target"). To obtain the alteration information, the lineage engine 208 may also utilize one or more applications (e.g., APIs, smart contracts, or the like generated by the application management engine 212) to monitor one or more transformations effected on the target. The lineage engine 208 may utilize processor 202, memory 204, or any other hardware component included in the apparatus 200 to perform these operations, as described in connection with FIG. 3 below. The lineage engine 208 may further utilize communications hardware 206 to gather data from a variety of sources (e.g., blockchain 108 and/or computing devices 112A-112N, as shown in FIG. 1), may utilize input-output circuitry of the communications hardware 206 to receive data from a user, and in some embodiments may utilize processor 202 and/or memory 204 to obtain the alteration information and utilize the application (s).

In addition, the apparatus further comprises a tokenizing engine 210 that tokenizes alteration information (e.g., the alteration information obtained by the lineage engine 208) into NFTs (e.g., NFT 110A in FIG. 1) to be minted as part of a data lineage chain (e.g., data lineage chain 109A of FIG. 1) on a blockchain (e.g., blockchain 108 of FIG. 1). The tokenizing engine 210 may utilize processor 202, memory 204, or any other hardware component included in the apparatus 200 to perform these operations, as described in connection with FIG. 3 below. The tokenizing engine 210 may further utilize communications hardware 206 to gather data from a variety of sources (e.g., blockchain 108, computing devices 112A-112N, as shown in FIG. 1), may utilize input-output circuitry of the communications hardware 206 to receive data from a user, and in some embodiments may utilize processor 202 and/or memory 204 to tokenize and mint the alteration information.

Finally, the apparatus 200 further comprises an application management engine 212 that manages (e.g., generates, causes transmission of, etc.) one or more applications (e.g., APIs, smart contracts, etc.). The application management engine 212 may utilize processor 202, memory 204, or any other hardware component included in the apparatus 200 to perform these operations, as described in connection with FIG. 3 below. The application management engine 212 may further utilize communications hardware 206 to transmit outputs generated as part of the execution of the course of action(s), and in some embodiments may utilize processor 202 and/or memory 204 to manage the application(s).

Although components 202-212 are described in part using functional language, it will be understood that the particular implementations necessarily include the use of particular hardware. It should also be understood that certain of these components 202-212 may include similar or common hardware. For example, lineage engine 208, tokenizing engine 210, and application management engine 212 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "engine" with respect to elements of the apparatus therefore shall be interpreted as necessarily including the particular hardware configured to perform the functions associated with the particular element being described. Of course, while the term "engine" should be understood broadly to include hardware, in some embodiments, the term "engine" may in addition refer to software instructions that configure the hardware components of the apparatus 200 to perform the various functions described herein.

Although the lineage engine 208, the tokenizing engine 210, and the application management engine 212 may leverage processor 202, memory 204, or communications hardware 206 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, or communications hardware 206 for enabling any functions not performed by special-purpose hardware elements. In all embodiments, however, it will be understood that the lineage engine 208, the tokenizing engine 210, and the application management engine 212 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third-party circuitries. In turn, apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of flowcharts.

Example Operations

Figure 3:
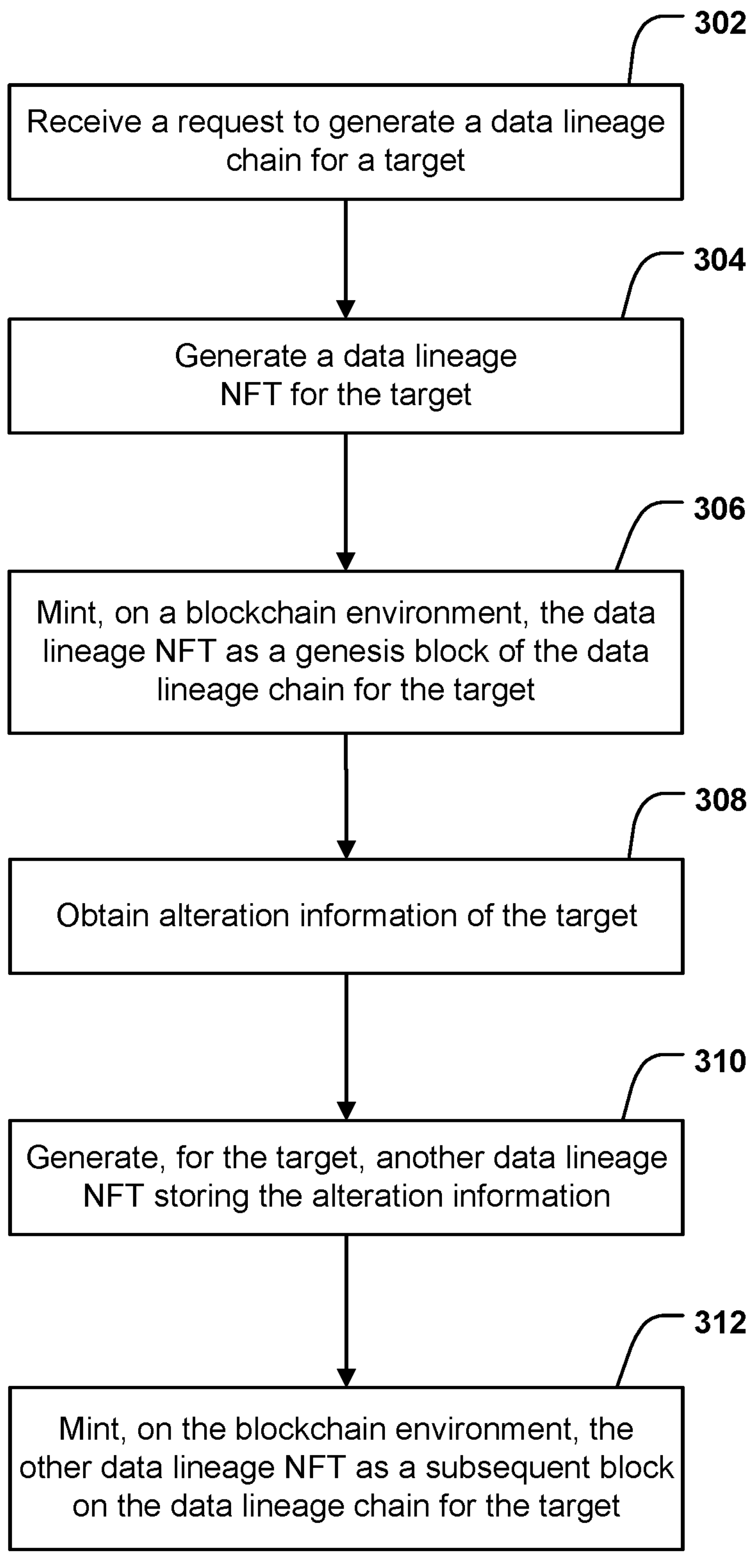
FIGS. 3 and 4 illustrate example flowcharts for enabling data lineage documentation, storage, and authentication using NFTs, in accordance with some example embodiments described herein.
Figure 4:
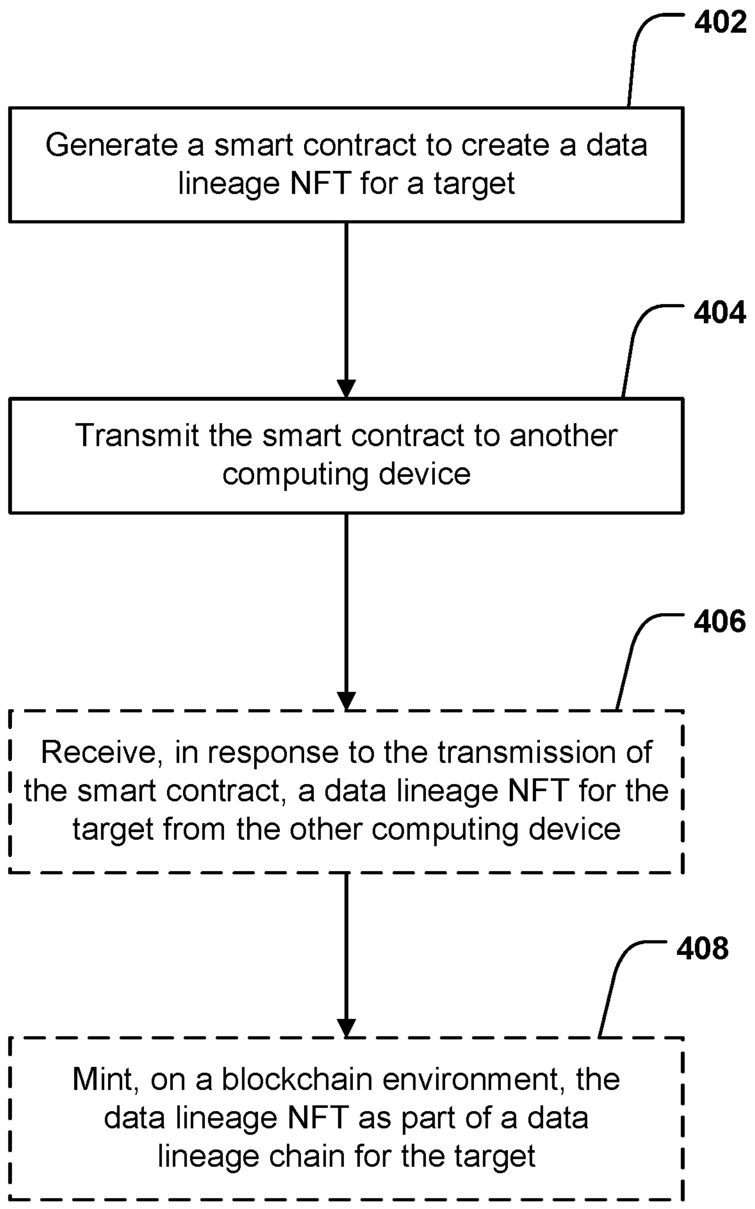

Turning to FIGS. 3 and 4, example flowcharts are illustrated that contain example operations implemented by example embodiments described herein. The operations illustrated in FIGS. 3 and 4 may, for example, be performed by system device 104 of the data lineage manager 102 shown in FIG. 1, which may in turn be embodied by apparatus 200 shown and described in connection with FIG. 2. To perform the operations described below, the apparatus 200 may utilize one or more of processor 202, memory 204, communications hardware 206 including input-output circuitry, lineage engine 208, tokenizing engine 210, and application management engine 212, and/or any combination thereof. It will be understood that user interaction with the data lineage manager 102 may occur directly via input-output circuitry of the communications hardware 206, or may instead be facilitated by a separate computing device, within environment 100 shown in FIG. 1, having similar or equivalent physical componentry facilitating such user interaction.

Turning now to FIG. 3, example operations are shown for enabling documentation, storage, and authentication of data lineage using NFTs.

As shown by operation 302, the apparatus 200 includes means, such as the lineage engine 208, or the like, for receiving a request to generate a data lineage chain for a target (e.g., a target piece of data). In some embodiments, the request may be received by the lineage engine 208 from another device via communications hardware 206 (e.g., received by communications hardware 206 from another computing device in connection with apparatus 200). Alternatively, the request may be received by the lineage engine 208 via the input-output circuitry of the communications hardware 206. For example, a user of the apparatus 200 may enter information (e.g., on a graphical user interface (GUI)) making up the request using the input-output circuitry of the communications hardware 206.

In some embodiments, the request may include information including: a name of the target, a source location of the target, a link to the source location(s), any permission information (e.g., a pin, a password, a key, etc.) necessary to access the source location(s), information specifying a blockchain (or more specifically, a blockchain and a location within the blockchain) on which the data lineage chain is to be hosted (e.g., stored), a name for the data lineage chain, retention information associated with (e.g., a retention policy of) the target(s), etc. Other information necessary for identifying and access the target as well as necessary for generation of the data linage chain may also be included. For example, if the blockchain is a private blockchain, the necessary permission information for accessing and storing data on the private blockchain may also be included in the request. In some embodiments, the request may specify more than one target. In an instance where the request specifies more than one target, the data lineage of all the targets specified in the request may be stored in a single data lineage chain.

As shown by operation 304, the apparatus 200 includes means, such as the tokenizing engine 210, or the like, for generating a data lineage NFT (e.g., NFT 110A in FIG. 1) for the target(s) (e.g., the target(s) specified in the request obtained in operation 302). In embodiments disclosed herein, the data lineage NFT generated in operation 304 may be a genesis block of the data lineage chain for the target(s). In some embodiments, the data lineage NFT generated as the genesis block of the data lineage chain for the target(s) may include information specifying: a source of the target(s), one or more contents of the target(s), an owner of the target(s), a size of the target(s), and or other similar information associated with one or more properties of the target(s).

As shown by operation 306, the apparatus 200 includes means, such as the tokenizing engine 210, or the like for minting the data lineage NFT generated in operation 304 (e.g., the data lineage NFT generated as the genesis block of a data lineage chain for the target(s)) onto a blockchain. In some embodiments, the tokenizing engine 210 may receive (or retrieve) information from the lineage engine 208 (e.g., information received by the lineage engine 208 in the form of the request received in operation 302) to determine the blockchain on which the data lineage chain should be created. Once the tokenizing engine 210 identifies the blockchain (and the location on the blockchain) on which the data lineage chain should be created, the tokenizing engine 210 initiates generation of the data lineage chain on the blockchain and mints the data lineage NFT as the genesis block of the newly generated data lineage chain. In some embodiments, the tokenizing engine 210 may communicate (e.g., transmit and/or receive instructions and other information) with the blockchain using the communications hardware 206 of the apparatus 200.

In some embodiments, the processes described above in operations 302-306 may also be referred to as a "data lineage chain initialization/creation process" for one or more targets specified in the request received in operation 302. Said another way, above operations 302-306 describe a process for instantiating a new data linage chain on a blockchain to document, store, and authenticate data lineage of one or more pieces of data a user (e.g., an owner of the pieces of data) wishes to preserve using the processes of one or more embodiments disclosed herein.

As shown by operation 308, the apparatus 200 includes means, such as the lineage engine 208, or the like, for obtaining alteration information of the target(s). The lineage engine 208 may obtain the alteration information in response to detecting (e.g., via using smart contracts, APIs, and/or other similar applications) that a transformation has occurred (e.g., has been effected) on the target(s). More specifically, the lineage engine 208 may utilize the application(s) (e.g., the smart contracts, APIs, or the like) to monitor the target(s). This monitoring may wherever target(s) are stored. For example, if the target(s) are still stored at the source location(s), the lineage engine 208 may utilize these application(s) to monitor the target(s) the source location(s). In an instance where the target(s) have been moved (e.g., copied) to a new location, the lineage engine 208 may utilize these application(s) to monitor the target(s) at all application locations in which the target is stored (e.g., the source location(s) containing the original copy of the target(s) and the new location containing the newly created copy of the target(s).

In some embodiments, the transformation effected on the target(s) may be associated with one or more actions involving the target(s). More specifically, the actions involving the target(s) may include at least one of: transforming a content of the target(s), changing an ownership of the target(s), changing a property of the target(s), changing a storage location of the target(s), creating a copy of the target(s), transmitting the target(s) or the copy of the target(s) to a different location from a source location of the target(s) or the copy of the target(s), using the target(s) (e.g., using the target(s) in one or more modeling solutions), and changing a retention policy of the target(s). Other actions involving the target(s) not discussed above may also be applicable to one or more embodiments disclosed herein. In general, all action(s) involving the target(s) (no matter how small or large from opening the target(s) if the target(s) are files to deleting the target(s)) may be detected as a transformation being applied to the target(s).

In some embodiments, the action(s) involving the target may be executed by one or more devices (e.g., computing devices 112A-112N in FIG. 1) in which the target(s) are stored. More specifically, these devices may be associated with an entity (e.g., an individual, a business, a bank, a corporation, etc.) that owns the target(s). Alternatively, or in addition to the above, the action(s) involving the target may be executed by one or more devices (e.g., computing devices 112A-112N in FIG. 1) belonging to one or more separate entities that are different from the entity that owns the target(s). These separate entities may be third-party vendors, clients, customers, or the like, that have permission from the owner of the target(s) to retrieve and use the target(s).

In some embodiments, under certain circumstances, the target(s) may be obtained (e.g., stolen, hacked, etc.) by third-party entities that do not have permission from the owner of the target(s) to retrieve and use the target(s). Such stealing of the target(s) by these third-party entities without permission to retrieve and use the target(s) may also be detected as the one or more action(s) involving the target(s).

As shown by operation 310, the apparatus 200 includes means, such as the tokenizing engine 210, or the like for generating another data lineage NFT for storing the alteration information (e.g., the alteration information obtained by the lineage engine 208 in operation 308). In some embodiments, the tokenizing engine 210 may include (via receiving the alteration information from the lineage engine 208) information specifying the action(s) involving the target(s) in the data lineage NFT generated in operation 310. The information specifying the action(s) involving the target(s) may also include (e.g., as being included as part of the alteration information received from the lineage engine 208): details of the different location to which the target(s) or the copy of the target(s) is transmitted, details of the ownership of the target(s), changes in the details of the ownership of the target(s), details of the retention policy, changes in the details of the retention policy, details with regard to one or more entities that used the data (e.g., name of the entities, time of use, number of uses, etc.), or the like.

As shown by operation 312 the apparatus 200 includes means, such as the tokenizing engine 210, or the like for minting the data lineage NFT generated in operation 310 as a subsequent block (e.g., a subsequent block to the genesis block) on the data lineage chain created for the target(s)) in operation 306. In some embodiments, the tokenizing engine 210 may retrieve (e.g., from memory 204) or receive (e.g., from the lineage engine 208) the location of the data lineage chain on the blockchain. The tokenizing engine 210 may then, in combination with the communications hardware 206 (e.g., coordinating with the communications hardware 206 to transmit and/or receive instructions and other information from the blockchain), mint the data lineage NFT generated in operation 310 to the blockchain on which the data lineage chain for the target(s) is hosted (e.g., stored).

In some embodiments, the processes described above in operations 308-312 may also be referred to as a "data lineage chain updating and documentation process" for one or more targets specified in the request received in operation 302. Said another way, above operations 308-312 describe a process for building onto the new data lineage chain generated in operations 302-306 in order to enhance the documentation, storage, and authentication of data lineage of one or more pieces of data a user (e.g., an owner of the pieces of data) wishes to preserve using the processes of one or more embodiments disclosed herein. Said another way, operations 308-312 enables data lineage NFT generation in response to a transformation of the target(s). For example, each time the target(s) are copied, this copy event may automatically trigger (e.g., through detection of the copy event by the lineage engine 208 in operation 308) addition of a new data lineage NFT to the data lineage chain generated for the target(s) via operations 302-306.

Turning now to FIG. 4, additional example operations are shown for further enhancing the documentation, storage, and authentication of data lineage using NFTs.

As shown by operation 402 the apparatus 200 includes means, such as the application management engine 212, or the like, for generating one or more smart contracts (or any other similar applications such as API(s)) to create a data lineage NFT for the target(s). In some embodiments, the data lineage NFT created by the smart contract(s) in operation 402 may be stored as the subsequent blocks on the data lineage chain associated with the target(s).

In some embodiments, the application management engine 212 may generate the smart contract(s) after a new data lineage chain has been created for a target (e.g., after operation 306 in FIG. 3). As discussed above in operation 308 of FIG. 3, the lineage engine 208 may utilize these smart contracts (or other similar applications) to monitor the target and detect any transformations being applied to the target.

In some embodiments, the application management engine 212 may also generate the smart contract(s) in response to the lineage engine 208 detecting that a transformation has been applied to the target (in particular, when the lineage engine 208 has detected that the target has been retrieved (e.g., directly through retrieval of an original instance of the target or indirectly through retrieval of a copy of the target) by a third-party entity (as discussed above in operation 308 of FIG. 3). In some embodiments, in an instance where a target is retrieved and/or transmitted from the original source location to another location, the end location where the target is ultimately stored after the retrieval and/or transmission may also be recorded as part of the alteration data obtained by the lineage engine 208.

For example, assume that the target belongs to a bank and that the target is a time series including financial data of the bank's customers that can be used by data scientists to generate inferences for the bank. The bank may give permission to a third-party vendor (e.g., a data analytics company) to retrieve the target for the third-party vendor to generate inferences for the bank. Upon detection by the lineage engine 208 that the bank transmitted the target to the third-party vendor (or that the third-party vendor retrieved the target directly from the bank's systems), the lineage engine 208 may cause the application management engine 212 to generate one or more applications (e.g., smart contracts, APIs, or the like). The lineage engine 208 may then cause the generated application(s) to be transmitted (e.g., using communications hardware 206) to the third-party vendor. This act of providing the application(s) to the third-party vendor ensures (as discussed in more detail below) that all transformations effected on the target by the third-party vendor will also be tokenized and stored as one or more data lineage NFTs on the data lineage chain on the blockchain associated with the target. As a result, documentation of the data lineage of the target would advantageously be as complete as can be since all transformation (by every entity to touch the target) applied to the target can be tracked (e.g., monitored and detected) and tokenized.

As shown by operation 402 the apparatus 200 includes means, such as the communications hardware 206, the application management engine 212, or the like, for transmitting the smart contract(s) (e.g., the smart contract(s) generated in operation 402) to another computing device (e.g., the computing device of one or more third-party entities that have retrieved and/or obtained the target from the entity that owns the target). In some embodiments, the application management engine 212 may provide the smart contract(s) (along with information about the other computing device such as an internet protocol (I.P. address), or the like) to the communications hardware 206 such that the communications hardware 206 may transmit the smart contract(s) to the other computing device.

Alternatively, rather than transmitting the smart contract(s) and in an instance where the target has not yet been obtained or retrieved by the other computing device, the application management engine 212 may append the smart contract(s) to the target such that any retrieval and/or obtaining of the target would also entrail the retrieval and/or obtaining of the smart contract(s) along with the target.

As shown by operation 406 (which is optional as shown as the broken lines in FIG. 4) the apparatus 200 includes means, such as the communications hardware 206 and the lineage engine 208, or the like, for receiving (e.g., in response to the transmission of the smart contract(s) in operation 404) a data lineage NFT for the target from the other computing device. More specifically, operation 406 is executed in an instance where the contents (e.g., the requirements set in) the smart contract(s)) cause the other computing device to transmit the data lineage NFT back to the apparatus 200. For example, assume that the data lineage chain generated for a target is hosted on a private blockchain accessible to only the apparatus 200. In this instance, the other computing device will not be able to build onto this existing data lineage chain hosted on a private blockchain and must transmit the data lineage NFT back to the apparatus 200 such that the continuity of the existing data lineage chain can advantageously be maintained.

As part of maintaining the continuity of an existing lineage chain, in some embodiments, if a data lineage chain of a target is created on a public blockchain, all subsequent data lineage NFTs generated for the target will be minted on the same public blockchain as part of the same data lineage chain. Similarly, if a data lineage chain of a target is created on a private blockchain, all subsequent data lineage NFTs generated for the target will be minted on the same private blockchain as part of the same data lineage chain. For example, the any one of the lineage engine 208 and the tokenizing engine 210 may determine, during the creation of the data lineage chain for a target as part of operations 302-306, whether the target is owned by a private or public entity. Based on determining whether the target is owned by a private entity, the lineage engine 208 and/or the tokenizing engine 210 may select a private blockchain for the creation of the data lineage chain for the target, or vice versa. Alternatively, a data lineage chain that was initially created on a private blockchain can be continued on a public blockchain, or vice versa, using one or more available blockchain interoperability techniques (e.g., permission-based sharing/minting of data between private and public blockchains, etc.).

As another example, assume that the other computing device is not configured with the capabilities to mint (let alone generate) NFTs. The smart contract(s) transmitted to such other computing device may include requirements for the other computing device to transmit the raw alteration data (rather than a data linage NFT) back to the apparatus 200. In general, the contents of the smart contract(s) may be configured in any of the manners discussed above (or any other appropriate manners) based on the circumstances surrounding the third-party entity that retrieves and/or obtains the target data.

As shown by operation 408, the apparatus 200 includes means, such as the tokenizing engine 210, or the like for minting the data lineage NFT (or the raw alteration information after the tokenizing engine 210 first tokenizes the alteration information) received from the other computing device in operation 406 onto the data lineage chain for the target. As discussed above in operation 312 of FIG. 3, in some embodiments, the tokenizing engine 210 may retrieve (e.g., from memory 204) or receive (e.g., from the lineage engine 208) the location of the data lineage chain on the blockchain. The tokenizing engine 210 may then, in combination with the communications hardware 206 (e.g., coordinating with the communications hardware 206 to transmit and/or receive instructions and other information from the blockchain), mint the data lineage NFT generated in operation 310 to the blockchain on which the data lineage chain for the target(s) is hosted (e.g., stored).

As described above, example embodiments provide methods and apparatuses that enable improved documentation, storage, and authentication of lineage data using NFTs. Example embodiments thus provide tools that overcome the problems faced by conventional data lineage documentation technologies and processes utilized in the technical fields of analytics and data management by allowing entities (e.g., individuals, corporations, businesses, etc.) to reflect (e.g., through storing) the entire data lineage of a piece of data on an immutable ledger (e.g., on a blockchain).

As these examples all illustrate, example embodiments contemplated herein provide technical solutions that solve real-world problems faced during management and documentation of data. In particular, conventionally, data lineage is not well-documented, and the sources of records (e.g., records of the piece of data) are typically not documented electronically in a data repository (e.g., a data lake). Additionally, recent advancements in technology have also contributed to an increased interest and demand of protecting and ensuring the accuracy (e.g., through application of more rigorous documentation and authentication processes) of data. At the same time, the recently arising ubiquity the above-discussed problem has unlocked new avenues to solving this problem that historically were not available, and example embodiments described herein thus represent a technical solution to these real-world problems.

FIGS. 3 and 4 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:

monitoring, by one or more APIs of a first entity at source locations separate from a private blockchain network, a target comprising a piece of data associated with a genesis block of the private blockchain network, wherein each of the source locations comprise a respective copy of the target, wherein the one or more APIs communicatively link at least in part the source locations to the private blockchain network;

detecting, by the one or more APIs of the first entity, an action executed by a second entity;

obtaining, by a lineage engine of a data lineage manager and in response to detecting the action, alteration information specifying respective alterations to the target at a first source location and a copy of the target at a second source location have been executed by the second entity different from the first entity, wherein the first source location and the second source location are separate from the private blockchain network, wherein the first source location and the second source location are mutually accessible to the first entity and the second entity, wherein the private blockchain network is accessible to the first entity via the data lineage manager and inaccessible to the second entity;

generating, by a tokenizing engine of the data lineage manager, a first data lineage NFT for the target and the copy of the target, wherein the alteration information is stored in the first data lineage NFT; and minting, by the tokenizing engine using permission information associated with the first entity, the first data lineage NFT onto the private blockchain network.

2. The method of claim 1, further comprises:

receiving, by the lineage engine, a request to generate a data lineage chain for the target on the private blockchain network, wherein the request specifies at least one source location of the source locations of the target and a location on the private blockchain network in which the data lineage chain is to be generated;

generating, by the tokenizing engine, a second data lineage NFT, wherein the second data lineage NFT stores the target and information specifying the at least one source location of the target; and minting, by the tokenizing engine, the second data lineage NFT, wherein the second data lineage NFT comprises the genesis block of the data lineage chain for the target, wherein the first data lineage NFT is a subsequent block of the data lineage chain stored after the genesis block.

3. The method of claim 2, further comprising:

determining, by the lineage engine, that the target is owned by a private entity; and selecting, by the tokenizing engine and based on determining that the target is owned by the private entity, the private blockchain network to host the data lineage chain for the target.

4. The method of claim 1, wherein the action involving the target comprises at least one of transforming a content of the target, changing an ownership of the target, changing a property of the target, changing at least one of the source locations of the target, creating one or more copies of the target, transmitting the target or the copy of the target to a different location from the source locations of the target or the copy of the target, using the target, and changing a retention policy of the target.

5. The method of claim 4, wherein the alteration information further specifies details for at least one of the different location to which the target or the copy of the target is transmitted, the ownership of the target, an ownership change of the target, the retention policy of the target, or a retention policy change of the target.

6. The method of claim 4, wherein obtaining the alteration information of the target further comprises:

detecting, by the lineage engine, execution of the action involving the target; and generating, by the lineage engine, the alteration information based on detecting the execution of the action involving the target.

7. The method of claim 4, wherein the action involving the target is executed by a computing device of a second user, wherein the second user is different from a first user to which the target belongs, wherein obtaining the alteration information of the target further comprises receiving, by the lineage engine, the alteration information from the computing device of the second user.

8. The method of claim 1, further comprising:

detecting, by the lineage engine of the data lineage manager, that the target is retrieved by a second user different from a first user to which the target belongs, wherein the target is retrieved from the first source location of the target on a first computing device by a second computing device associated with the second user, wherein the second computing device is different from the first computing device; and in response:

generating, by an application management engine, a smart contract specifying that a second data lineage NFT is to be generated and that the second data lineage NFT is to be minted on the private blockchain network as part of a data lineage chain comprising the first data lineage NFT when the second user performs a second at least action involving the target, and transmitting, by communications hardware of the data lineage manager, the smart contract to the second computing device.

9. The method of claim 1, further comprising:

detecting, by the lineage engine of the data lineage manager, that the target is retrieved by a second user different from a first user to which the target belongs, wherein the target is retrieved from the first source location of the target on a first computing device by a second computing device associated with the second user, wherein the second computing device is different from the first computing device; and in response:

generating, by an application management engine, a smart contract specifying that a second data lineage NFT is to be generated and that the second data lineage NFT is to be transmitted by the second computing device to the first computing device, and transmitting, by communications hardware of the data lineage manager, the smart contract to the second computing device.

10. The method of claim 9, further comprising:

receiving, by the communications hardware and from the second computing device, the second data lineage NFT; and minting, by the tokenizing engine and on the private blockchain network hosting the first data lineage NFT, the second data lineage NFT after the first data lineage NFT on a data lineage chain associated with the target.

11. An apparatus comprising:

one or more APIs of a first entity configured to:

monitor, at source locations separate from a private blockchain network, a target comprising a piece of data associated with a genesis block of the private blockchain network, wherein each of the source locations comprise a respective copy of the target, wherein the one or more APIs communicatively link at least in part the source locations to the private blockchain network, and detect an action executed by a second entity;

a lineage engine configured to obtain, in response to detecting the action, alteration information specifying respective alterations to the target at a first source location and a copy of the target at a second source location have been executed by the second entity different from the first entity, wherein the first source location and the second source location are separate from the private blockchain network, wherein the first source location and the second source location are mutually accessible to the first entity and the second entity, wherein the private blockchain network is accessible to the first entity via a data lineage manager and inaccessible to the second entity; and a tokenizing engine configured to:

generate a first data lineage NFT for the target and the copy of the target, wherein the alteration information is stored in the first data lineage NFT, and mint, using permission information associated with the first entity, the first data lineage NFT onto the private blockchain network.

12. The apparatus of claim 11, wherein the lineage engine is further configured to receive a request to generate a data lineage chain for the target on the private blockchain network, wherein the request specifies at least one source location of the source locations of the target and a location on the private blockchain network in which the data lineage chain is to be generated, and wherein the tokenizing engine is further configured to:

generate a second data lineage NFT, wherein the second data lineage NFT stores the target and information specifying the at least one source location of the target, and mint the second data lineage NFT, wherein the second data lineage NFT comprises the genesis block of the data lineage chain for the target, wherein the first data lineage NFT is a subsequent block of the data lineage chain stored after the genesis block.

13. The apparatus of claim 12, wherein the lineage engine is further configured to determine that the target is owned by a private entity, wherein the tokenizing engine is further configured to select, based on determining that the target is owned by the private entity, the private blockchain network to host the data lineage chain for the target.

14. The apparatus of claim 11, wherein the action involving the target comprises at least one of transforming a content of the target, changing an ownership of the target, changing a property of the target, changing at least one of the source locations of the target, creating one or more copies of the target, transmitting the target or the copy of the target to a different location from at least one of the source locations of the target or the copy of the target, using the target, and changing a retention policy of the target.

15. The apparatus of claim 14, wherein the alteration information further specifies details for at least one of the different location to which the target or the copy of the target is transmitted, the ownership of the target, an ownership change of the target, the retention policy of the target, or a retention policy change of the target.

16. A computer program product for payment card identification, the computer program product comprising at least one non-transitory computer-readable storage medium storing software instructions that, when executed, cause an apparatus to:

monitor, by one or more APIs of a first entity at source locations separate from a private blockchain network, a target comprising a piece of data associated with a genesis block of the private blockchain network, wherein each of the source locations comprise a respective copy of the target, wherein the one or more APIs communicatively link at least in part the source locations to the private blockchain network;

detect, by the one or more APIs of the first entity, an action executed by a second entity;

obtain, in response to detecting the action, alteration information specifying respective alterations to the target at a first source location and a copy of the target at a second source location have been executed by the second entity different from the first entity, wherein the first source location and the second source location are separate from the private blockchain network, wherein the first source location and the second source location are mutually accessible to the first entity and the second entity, wherein the private blockchain network is accessible to the first entity via a data lineage manager and inaccessible to the second entity;

generate a first data lineage NFT for the target and the copy of the target, wherein the alteration information is stored in the first data lineage NFT; and mint, using permission information associated with the first entity, the first data lineage NFT onto the private blockchain network.

17. The computer program product of claim 16, wherein the apparatus is further caused to:

receive a request to generate a data lineage chain for the target on the private blockchain network, wherein the request specifies at least one source location of the source locations of the target and a location on the private blockchain network in which the data lineage chain is to be generated;

generate a second data lineage NFT, wherein the second data lineage NFT stores the target and information specifying the at least one source location of the target; and mint the second data lineage NFT, wherein the second data lineage NFT comprises the genesis block of the data lineage chain for the target, wherein the first data lineage NFT is a subsequent block of the data lineage chain stored after the genesis block.

18. The computer program product of claim 17, wherein the apparatus is further caused to:

determine that the target is owned by a private entity; and select, based on determining that the target is owned by the private entity, the private blockchain network to host the data lineage chain for the target.

19. The computer program product of claim 17, wherein the action involving the target comprises at least one of transforming a content of the target, changing an ownership of the target, changing a property of the target, changing at least one of the source locations of the target, creating one or more copies of the target, transmitting the target or the copy of the target to a different location from the source locations of the target or the copy of the target, using the target, and changing a retention policy of the target.

20. The computer program product of claim 19, wherein the alteration information further specifies details for at least one off the different location to which the target or the copy of the target is transmitted, the ownership of the target, an ownership change of the target, the retention policy, or a retention policy change of the target.

* * * * *